July 24, 1923.
J. W. CONNELL ET AL
1,462,932
BRAKE ROD ATTACHMENT
Filed Dec. 15, 1921
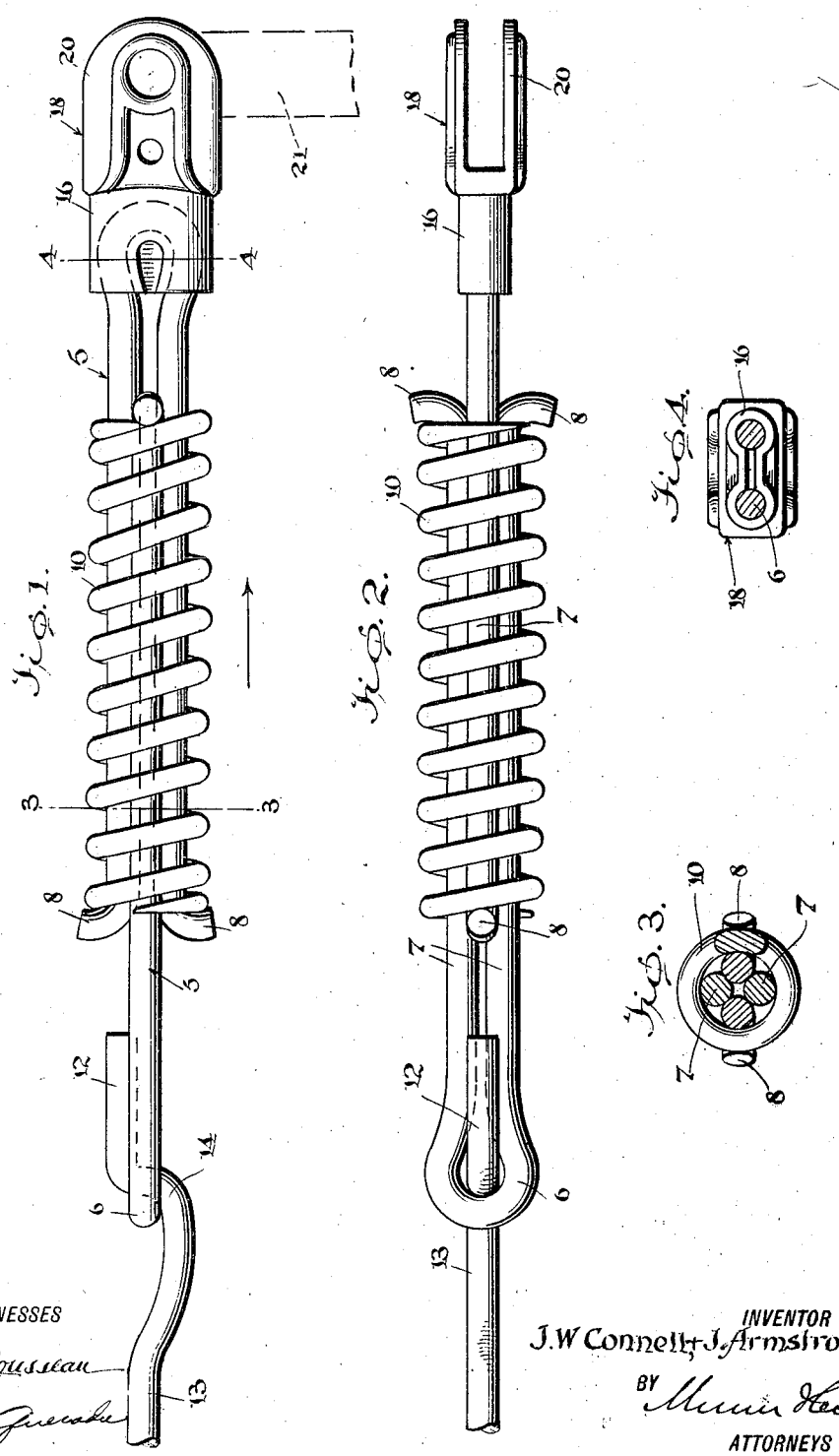
WITNESSES
INVENTOR
J. W. Connell + J. Armstrong
BY
ATTORNEYS Patented July 24, 1923.

1,462,932

UNITED STATES PATENT OFFICE.

JOHN WESLEY CONNELL AND JOHN ARMSTRONG, OF CENTRALIA, WASHINGTON.

BRAKE-ROD ATTACHMENT.

Application filed December 15, 1921. Serial No. 522,561.

*To all whom it may concern:*

Be it known that we, JOHN WESLEY CONNELL and JOHN ARMSTRONG, citizens of the United States, and residents of Centralia, in the county of Lewis and State of Washington, have invented certain new and useful Improvements in Brake-Rod Attachments, of which the following is a specification.

This invention relates to brake rod attachments and has for its object the production of novel means whereby the action of the brake rod is cushioned so as to increase the braking power and prevent the brake shoes from being too suddenly applied in case of an emergency application of the brakes.

A further object of the invention is to provide a brake rod attachment which may be readily and conveniently applied to engines, passenger coaches, freight cars, street cars and all vehicles having brakes, the said brake rod attachment being capable of application without substantially altering the original construction.

Other objects and advantages of the invention will be apparent during the course of the following description.

In the accompanying drawing forming a part of this application and in which like numerals are employed to designate like parts throughout the same, Figure 1 is a side elevation of the improved attachment.

Figure 2 is a plan view of the improved attachment.

Figure 3 is a vertical transverse sectional view taken on line 3—3 of Figure 1.

Figure 4 is a vertical transverse sectional view taken on line 4—4 of Figure 1.

In the drawing wherein for the purpose of illustration is shown a preferred embodiment of the invention the numerals 5 generally designate a pair of sections slidable with relation to each other and each being formed from a single length of metal bent intermediate its ends to provide an attaching loop 6 and a pair of spaced parallel side rods 7, the forward portions of which are overlapped and having sliding contact with each other.

As illlustrated in Figures 1 and 2, the forward ends of the spaced parallel side rods 7 are extended laterally as indicated at 8 to provide abutments for the ends of a coiled spring 10 arranged on the rods 7 and constituting means to hold the rods against lateral movement with relation to each other.

The loop 6 of one of the sections of the attachment receives the offset terminal portion 12 of a link 13 and the curved or bent portion 14 of the link contacts with the rear wall of the loop so that when the attachment is moved longitudinally the link also will be moved for operating the brake.

The other loop 6 is received with a socket 16 of a head generally designated by the numeral 18, said head being provided with a pair of spaced parallel apertured ears 20 adapted for connection with the brake operating mechanism 21 which may in turn be connected to a pedal, a lever or the like.

It will be seen that the attachment provides a yieldable connection between the operating member 21 and the link 13 so that when the brakes are applied, a cushioning action will take place. This greatly lessens the strain incident to the application of the brakes and prevents the shoes from binding as the result of an emergency application of the brakes.

In cases where emergency application of brakes is made on railroad trains where air brakes are used the attachment will prevent breaking of the trains in two, also breaking of levers, rods, hangers and brake beams which often drop on the tracks, thereby causing serious wrecks and will prevent the sliding of wheels in cases where defective air brake cripples develop after train leaves terminal which is very expensive to the railroad operators.

The parts do not require frequent attention and by reason of the construction are not easily rendered inoperative. As illustrated in Figures 1 and 2 the shaft 16 and the offset terminal portion 12 are in the line of the laterally projecting stops 8 so that these parts limit the movement of the rods onto each other. This prevents the device from getting out of order and maintains the same in a working condition at all times.

Having thus described the invention what we claim is:—

The combination of a pair of overlapped slidably connected sections, each of which consists of a length of metal bent intermediate its ends to provide a loop and a pair of spaced parallel side rods, the terminal portions of each pair of side rods being extended laterally to form stops, a coiled spring confined between said stops, all of said side rods being received within said coiled spring and held in position thereby, a head having a socket receiving one of said loops, said head being provided with means whereby the same may be connected to a brake operating mechanism, and a link having an offset portion extending through the loop at one end of one of the sections, said offset portion and said head being in the line of said laterally projecting stops to limit the sliding movement of the same.

JOHN WESLEY CONNELL.
JOHN ARMSTRONG.